United States Patent Office 3,081,282
Patented Mar. 12, 1963

3,081,282
NOVEL POLYMERS AND THEIR PREPARATION
Herman F. Mark, Brooklyn, N.Y., assignor to Polaroid Corporation, Cambridge, Mass., a corporation of Delaware
No Drawing. Filed Apr. 3, 1958, Ser. No. 726,041
6 Claims. (Cl. 260—78.4)

This invention relates to novel compositions of matter and particularly to novel polymers and to processes for preparing such polymers.

A great deal of activity and experimentation has been carried on in the polymerization of vinyl monomers to obtain many useful vinyl polymers. It has been recognized that, in theory, addition polymerization could occur in one of two ways, as determined by the relative positions of the substituents along the length of hte macromolecule. In all cases, it has been found that the sequence of the substituents (Z) is essentially of the 1,3- or head-to-tail sequence. In some instances, a small percentage of segments may exhibit the other possible arrangement, namely 1,2- or head-to-head polymerization, as a portion of the complete polymer molecule. Thus:

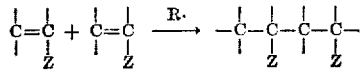

1, 3- or head-to-tail

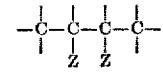

1, 2- or heah-to-head

Thus, the known vinyl polymers consist either essentially completely of 1,3- or head-to-tail segments or contain a small number of 1,2- or head-to-head segments within the predominantly 1,3-polymer chain. For example, it has been observed that polyvinyl alcohol is predominantly 1,3- but does contain a minor proportion of 1,2- glycolic units. Hydrolysis of copolymers of vinyl acetate and vinylene carbonate will produce polymers containing some

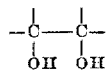

units because of the vinylene carbonate co-monomer, but such copolymers do not have the characteristic head-to-head segments of the polymers of this invention.

I have now discovered and prepared linear vinyl polymers with essentially continuous head-to-head or 1,2- structure. I have also discovered processes for preparing such head-to-head polymers. The existence of the essentially continuous head-to-head arrangement of the substituents can be established by analytical methods such as infrared absorption analysis, X-ray diffraction and comparison of chemical and physical properties with the known 1,3- or head-to-tail polymers.

The principal objects of this invention are to provide novel 1,2- or head-to-head vinyl polymers, including copolymers, and processes for their preparation.

A further object is to provide novel polymers which contain recurring six-membered rings as the essential structural unit, which polymers are particularly useful as intermediates in the preparation of head-to-head vinyl polymers, and processes for the preparation of such polymeric intermediates.

Still another object is to provide novel polymers which are useful in the formation of films, fibres and extruded, cast and molded articles.

Other objects of the invention will in part be obvious and will in part appear hereinafter.

The invention accordingly comprises the process involving the several steps and the relation and order of one or more of such steps with respect to each of the others and the compositions of matter possessing the features and properties which are exemplified in the following detailed disclosure, and the scope of the application of which will be indicated in the claims.

For a fuller understanding of the nature and objects of the invention, reference should be had to the following detailed description.

The linear vinyl head-to-head polymers of this invention have recurring structural units of the general formula:

(I) 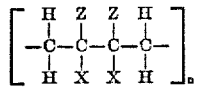

wherein Z represents the functional substituents, for example, hydroxyl, carboxyl,

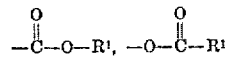

and cyano (—C≡N), X represents hydrogen or another substituent, such as alkyl, aryl, halogen, etc., and $n$, the degree of polymerization, is a figure ranging from 10 to 10,000, with a preferred range between 200 and 2,000. As used herein, the terms "alkyl" and "aryl" include substituted derivatives thereof.

One class of vinyl head-to-head polymers which may be prepared in accordance with this invention are head-to-head polyvinyl esters of the general formula:

(II) 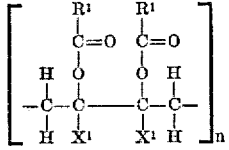

wherein $R^1$ is an alkyl or aryl group, $X^1$ is hydrogen, halogen, alkyl, aryl, cyano (—C≡N) or

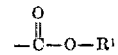

and $n$ is the same as above.

The head-to-head polyvinyl esters of Formula II may be hydrolyzed to give the corresponding polyvinyl alcohols, i.e., polymers of the general Formula I, wherein $X^1$ is hydrogen and Z is —OH. It will be understood that the degree of hydrolysis may be varied to obtain a product containing both hydroxyl and ester substituents.

Another class of head-to-head polyvinyl polymers which may be prepared in accordance with this invention are head-to-head polyvinyl halides of the general formula:

(III) 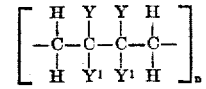

wherein Y is halogen, e.g., chlorine, bromine or iodine, $Y^1$ is hydrogen or halogen, and $n$ has the same meaning as above. These may be prepared, e.g., by polymerizing the halogenated divinyloxalates, e.g., $\alpha,\alpha'$-dichlorovinyloxalate, hydrolyzing to obtain the corresponding halogenated polyvinyl alcohols, and reducing with lithium aluminum hydride to the polyvinyl halide.

Still another class of head-to-head vinyl polymers which may be prepared in accordance with this invention are head-to-head polyacrylic acid derivatives of the general formula:

(IV) 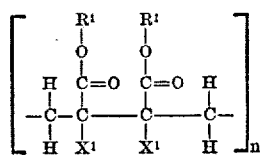

wherein $X^1$, $R^1$ and $n$ have the same meaning as above. Some or all of these ester groups may be converted to the free acid.

Another class of head-to-head vinyl polymers which may be prepared in accordance with this invention are head-to-head polyacrylonitriles of the general formula:

(V)
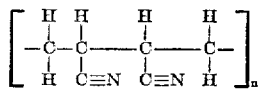

wherein $n$ has the same meaning as above.

It is further contemplated to prepare head-to-head copolymers of the above-mentioned types wherein two or more appropriate divinyl monomers are copolymerized and the copolymer contains structural units arranged along the length of the chain of a linear macromolecule in such a manner that while the functional substituents of each monomer unit are on adjacent carbon atoms in an essentially continuous head-to-head or 1,2- arrangement, pairs of carbons in a 1,3- configuration with each other may carry different functional substituents.

The novel head-to-head polymers of this invention can exist in several stereo isomers, namely, as atactic, isotactic or syndotactic structures, depending upon the steric arrangement of the individual substituents at the tertiary carbon atoms.

The novel head-to-head polymers of this invention are prepared by polymerization in a relatively dilute solution of a monomer which contains two double bonds in such positions that during a free radical initiated addition polymerization, a ring of six atoms is formed, i.e., the two double bonds are separated by four atoms, and the resulting polymer consists of a sequence of such rings which are opened by hydrolysis or other appropriate reaction to provide the head-to-head polymer. These intermediate polymers are frequently useful per se, and may be represented as having structural units of the general formula:

(VI)
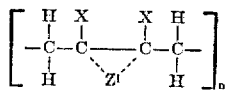

wherein $X$ and $n$ have the same meaning as above, and $Z^1$ represents the four atoms (carbon, oxygen or nitrogen) necessary to complete a six-membered ring which will open when subjected to hydrolysis or other treatment. Thus, $Z^1$ may be a diester

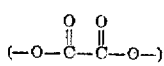

or diamide

Splitting of the ring may be effective to form the desired functional substituents, e.g., —OH, as in Formula I, as illustrated in Example 1. In another embodiment, e.g., in the preparation of the polymers of Formula V, as illustrated in Example 2, the functional substituents are present prior to opening of the ring, and the substituents formed on opening of the ring may be replaced with hydrogen atoms by appropriate reaction, e.g., by reduction.

Head-to-head polyacrylic acid derivatives may be prepared via a six-membered ring intermediate:

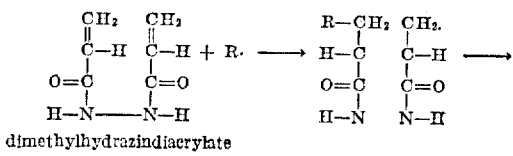
dimethylhydrazindiacrylate

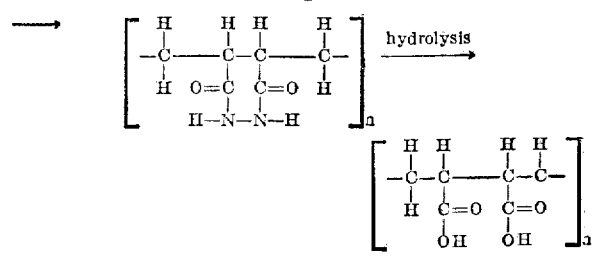

While in the above illustrations splitting of the ring has been effected by hydrolysis, the intermediate ring may be opened in other ways, as for example, by alcoholysis.

The polymerization of the divinyl monomers is performed in solution, and preferably in dilute solution, or by emulsion polymerization techniques, with monomer concentrations not much above 10% and preferably less than 5%. I have found that bulk polymerization of these divinyl monomers gives a cross-linked gel rather than the desired head-to-head linear polymers. In general, any of the free radical or ionic addition polymerization catalysts may be employed. As examples of suitable catalysts, mention may be made of peroxides, such as benzoyl peroxide, azo catalysts, such as bis-azoisobutyronitrile and Friedel-Crafts type acids and alkali metals. Polymerization with free radicals is effected at elevated temperatures, for example, at about 50 to 100° C. This temperature is selected to give rapid generation of the free radicals and a sufficiently high polymerization rate. Lower temperatures—from —60° C. to +40° C.—can be applied if ionic catalysts are used, since their energy of activation is, in general, lower than that of free radical initiators.

The novel polymers of this invention are useful in forming films and fibres, as well as in forming molded, extruded or cast articles, as will be illustrated in connection with the following specific examples, which are given as illustrative of the invention.

*Example 1*

3.1 grams of divinyloxalate are dissolved in 360 ml. of methylethyl ketone and a solution of 0.12 gram of bis-azoisobutyronitrile is added. The solution is kept at 85° C. under mild stirring for 3–4 hours. An increase of viscosity indicates the progress of the polymerization of the ester, which is essentially completed after 3 hours. The solution is cooled to 70° C. and 100 ml. of the solvent are distilled off in vacuo. Then, at room temperature, the polymer is precipitated by the addition of methanol, filtered off, washed several times with cold methanol and dried for 8 hours at 35° C. in vacuo.

The product, 2.6 grams of a white powder, has a density of 1.22, is insoluble in water, alkali and acids, but is readily soluble in organic liquids such as ketones and esters. Dilute solutions in methylethyl ketone lead to an intrinsic viscosity of 1.4 and an osmotic molecular weight of 220,000. Films cast from a 20% solution in methylethyl ketone were colorless, transparent, flexible and tough, and had a softening range around 135° C.

1.5 grams of this polymer were dissolved in 50 ml. of methylethyl ketone and treated for 1½ hours at 65° C. with 1.9 grams of NaOH dissolved in 15 ml. of methanol. The resulting gelatinous solution was treated with 15 ml. of water in order to become clear and fluid. The polymeric alcohol was then precipitated by the addition of methanol and separated by centrifugation. The gelatinous coagulate was three times washed with cold methanol and recovered by centrifugation. Finally, the material was brought on a filter and dried in vacuo at 30° C. for 15 hours. The product head-to-head polyvinyl alcohol is a white horny mass, which is soluble in warm water, alcohol and alkali, but insoluble in benzene and other hydrocarbons. Films of it are crystalline and can be oriented by stretching. In the stretched state, they give a sharp and distinct X-ray fibre diagram which is noticeably different from that of normal polyvinyl alcohol. The oriented films show sharp dichroism, if stained with iodine or organic dyestuffs. The infrared absorption spectrum is different from that of normal polyvinyl alcohol and indicates the presence of 1,2-dihydroxyl groups.

Treatment of the polymer with periodic acid in sulfuric acid solution leads to a rapid and complete depolymerization of the material. It is well-known that 1,2-glycol structures may be split by periodic acid, and that the degree of depolymerization is representative of the number of 1,2-glycol segments present. This complete depolymerization is a conclusive proof of the essentially head-to-head structure of this new polyvinyl alcohol.

*Example 2*

Addition of HCN to acetic acid anhydride gives the monocyanohydrine of the anhydride and splitting off of water leads to the alpha cyano vinyl acetate. Ester interchange of this compound with dimethyl oxalate produces the $\alpha,\alpha'$-dicyano-divinyloxalate.

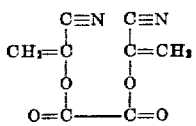

4.2 grams of this compound were dissolved in 350 ml. of methylethyl ketone and 0.18 gram of azo-bis-isobutyronitrile were added to this solution in a 600 ml. stirring flask at room temperature. The system was then heated to 90° C. whereupon polymerization occurred as indicated by an increase of the viscosity. After 4 hours, the reaction is substantially completed but the polymer remains at that temperature soluble in methylethyl ketone. Upon cooling to 40° C., it separates out as a gelatinous, cheesy mass which is separated from the supernatant liquid by decantation, washed several times with cold methanol and dried in vacuo at 30° C. One obtains 3.75 grams of a white powder with a density of 1.15, which is insoluble in most organic liquids at room temperature but does dissolve in esters and ketones at ttemperatures above 60° C. Osmotic and intrinsic viscosity measurements showed that the molecular weight was in the range of 80,000 to 100,000.

2.8 grams of this material were dissolved in 50 ml. methylethyl ketone at 70° C. and 1.7 grams of $NaOCH_3$ were added under stirring. As the saponification of the ester progresses, a gelatinous precipitate forms which is separated from the liquid phase by centrifugation, three times washed at room temperature with acetone and dried at 35° C. in vacuo for 7 hours. 1.6 grams of a white powder are obtained which were dissolved in dioxane at 80° C. and treated for 3 hours with lithium aluminum hydride under stirring. The hydroxyl groups of the polymer are, thereby, reduced and a head-to-head polyacrylonitrile is obtained which separates from the solution in the form of a fluffy precipitate. The system is cooled to room temperature, the polymer brought onto a filter, repeatedly washed with acetone and methanol, and finally dried in vacuo at 40° C. for 6 hours. 0.95 gram of a hard, white powder is obtained which has a density of 1.28, is not soluble in any liquid at room temperature, but can be dissolved in dimethylformamide at temperatures above 80° C. Films cast from such solutions are clear and tough and give a sharp X-ray ring diagram. After orientation of such films through stretching or rolling, the samples give typical X-ray fibre diagrams with an identity period of 5.1 Angstrom units. This shows that the chain is essentially planar and that the substituents at the tertiary carbon atoms are so disposed that two subsequent head-to-head nitrile groups are in identical configuration. I propose for this arrangement the name "homotactic" and reserve "heterotactic" for such cases where the head-to-head nitrile group pairs have alternating configuration.

Head-to-head polyacrylonitrile does not melt on heating up to 300° C. but discolors and decomposes upon prolonged exposure to temperatures above 200° C. It can be spun into strong tough and resilient fibres and cast into clear, flexible films of high tensile strength. It is completely resistant against the action of solvents and its exceptional chemical inertness makes it a very valuable material for spinning, casting, extruding and molding.

As noted in Example 1, the 1,2-polyvinyl alcohol, when oriented and stained with iodine or organic dyes, in a manner similar to that used with normal polyvinyl alcohol, gives an oriented film which exhibits sharp dichroism. Such oriented, dichroic films are useful as light polarizers.

Since certain changes may be made in the above processes and compositions of matter without departing from the scope of the invention herein involved, it is intended that all matter contained in the above description shall be interpreted as illustrative and not in a limiting sense.

What is claimed is:

1. A process of preparing synthetic linear vinyl polymers consisting essentially of recurring structural units wherein the functional substituents are attached to adjacent carbon atoms in the polymer backbone, said functional substituents being selected from the group consisting of —OH, halogen, and —C≡N, said process comprising polymerizing, in dilute solution and with a free radical initiating addition polymerization catalyst, a divnyloxalate monomer whose vinyl groups are separated by a

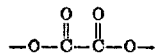

group to form a homopolymer containing six-membered rings which include said

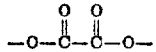

group, the backbone of said homopolymer including two adjacent carbon atoms which are part of said ring, and opening said rings.

2. Poly ($\alpha,\alpha'$-dicyano-divinyloxalate).

3. Poly ($\alpha,\alpha'$-dichloro-divinyloxalate).

4. The process which comprises polymerizing divinyloxalate, as the sole vinyl monomer, in dilute solution in the presence of a free radical initiating addition polymerization catalyst and hydrolyzing the resulting homopolymer to a polymer identical in structure with head-to-head, tail-to-tail, polyvinyl alcohol.

5. The process which comprises polymerizing $\alpha,\alpha'$-dicyano-divinyloxalate in dilute solution in the presence of a free radical initiating addition polymerization catalyst to form a polymer containing recurring

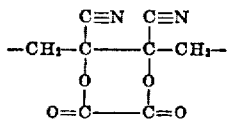

groups, hydrolyzing said polymer to form a polymer containing recurring

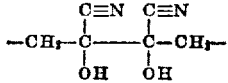

groups, and reducing the polymeric hydrolysis product to a polymer identical in structure with head-to-head, tail-to-tail, polyacrylonitrile.

6. The process which comprises $\alpha,\alpha'$-dichlorodivinyloxalate in dilute solution in the presence of a free radical initiating addition polymerization catalyst, hydrolyzing the resulting polymer to the corresponding chloro-substituted polyvinyl alcohol, and reducing the last-mentioned polymer to a polymer identical in structure with head-to-head, tail-to-tail, polyvinyl chloride.

(References on following page)

References Cited in the file of this patent

UNITED STATES PATENTS

| | | |
|---|---|---|
| 2,047,398 | Voss et al. | July 14, 1936 |
| 2,417,607 | Mowry | Mar. 18, 1947 |
| 2,471,959 | Hunt | May 31, 1949 |
| 2,479,367 | Joyce et al. | Aug. 16, 1949 |
| 2,663,701 | Gluesenkamp | Dec. 22, 1953 |
| 2,847,398 | Gluesenkamp | Aug. 12, 1958 |
| 2,847,402 | Gluesenkamp et al. | Aug. 12, 1958 |
| 2,921,928 | Field et al. | Jan. 19, 1960 |

FOREIGN PATENTS

| | | |
|---|---|---|
| 925,500 | Germany | Mar. 24, 1955 |
| 776,326 | Great Britain | June 5, 1957 |

OTHER REFERENCES

Marvel et al.: J. Am. Chem. Soc. 61, 3156–60 (1939).

Bunn: "Advances in Colloid Science," vol. 11, pages 123–4, Interscience Publishers, Inc., New York (1946).

Flory et al.: Journal Polymer Science, vol. 3, pages 880–890, (1948).

Flett et al.: "Maleic Anhydride Derivatives," John Wiley & Sons Inc. (1952), pages 26–27.

D'Alelio: "Fundamental Principles of Polymerization" (1952), published by John Wiley & Sons, Inc., New York, pages 109–110 relied on.

Flory: "Principles of Polymer Chemistry," published by Cornell University Press, Ithaca, N.Y. (1953), pages 232–233 relied on.

Holt et al.: Proc. Royal Soc. (London) A238, 154 (1956).

Marvel et al.: J. Am. Chem. Soc. 79, 5771-3, November 1957.

Billmeyer: "Textbook of Polymer Chemistry" (1957), Interscience Publishers, Inc., New York, pages 194–195 relied on.

Marvel et al.: J. Am. Chem. Soc. 80, 1740–44 (1958).

Jones: J. Poly. Sci. 33, Dec. 15, 1958, pages 15–20.

Crawshaw et al.: J. Am. Chem. Soc. 80, 5464, October 1958.

UNITED STATES PATENT OFFICE
CERTIFICATE OF CORRECTION

Patent No. 3,081,282                        March 12, 1963

Herman F. Mark

It is hereby certified that error appears in the above numbered patent requiring correction and that the said Letters Patent should read as corrected below.

Column 1, line 17, for "hte" read -- the --; column 3, line 71, strike out the arrow, second occurrence; column 5, line 40, for "ttemperatures" read -- temperatures --; column 6, lines 27 and 28, for "divnyloxalate" read -- divinyloxalate --; column 7, line 8, for "2,663,701 Gluesenkamp ----- Dec. 22, 1953" read -- 2,663,701 Ronay et al. ---- Dec. 22, 1953 --.

Signed and sealed this 28th day of April 1964.

(SEAL)
Attest:
ERNEST W. SWIDER

Attesting Officer

EDWARD J. BRENNER
Commissioner of Patents